Patented Jan. 2, 1923.

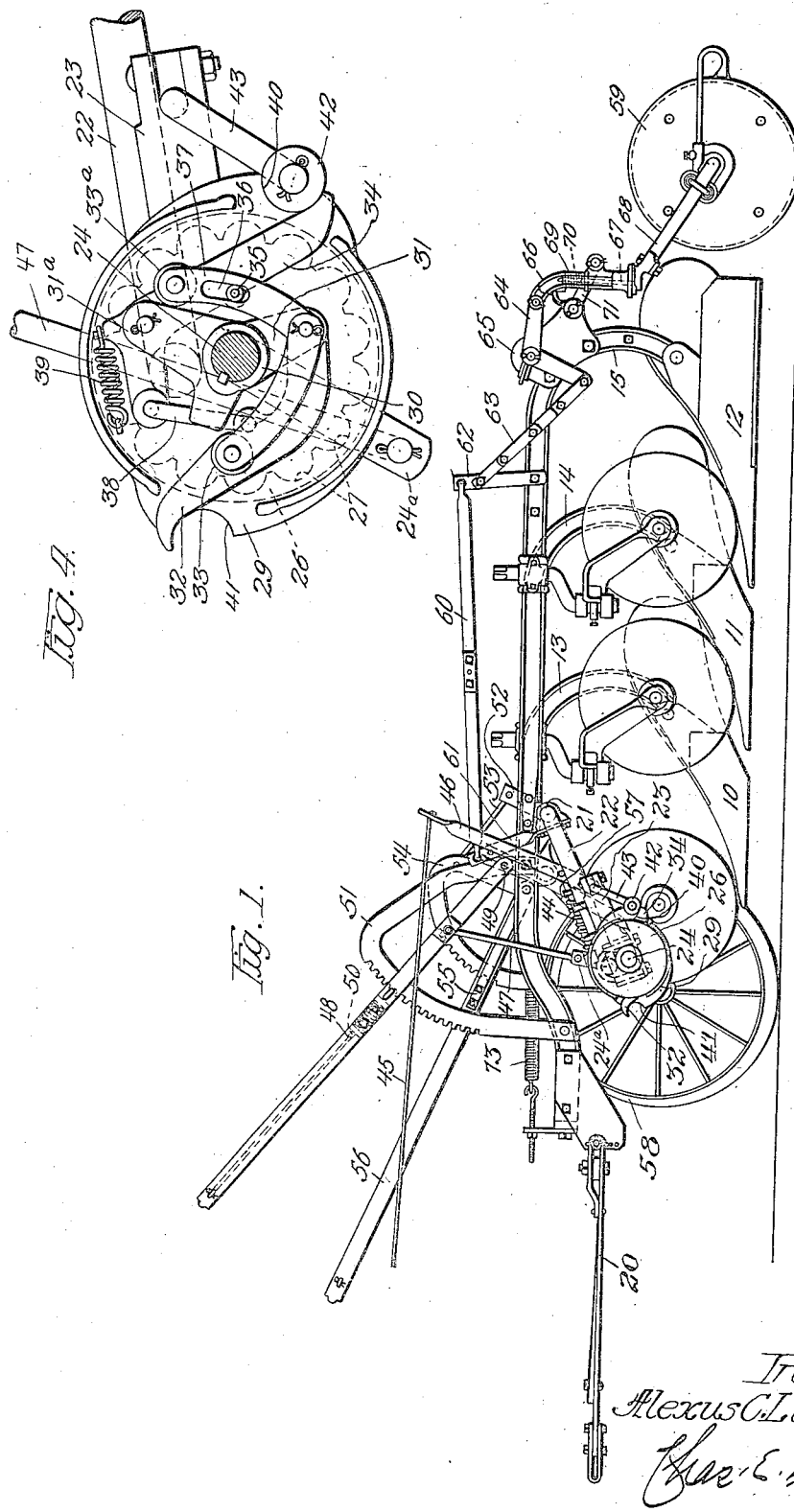

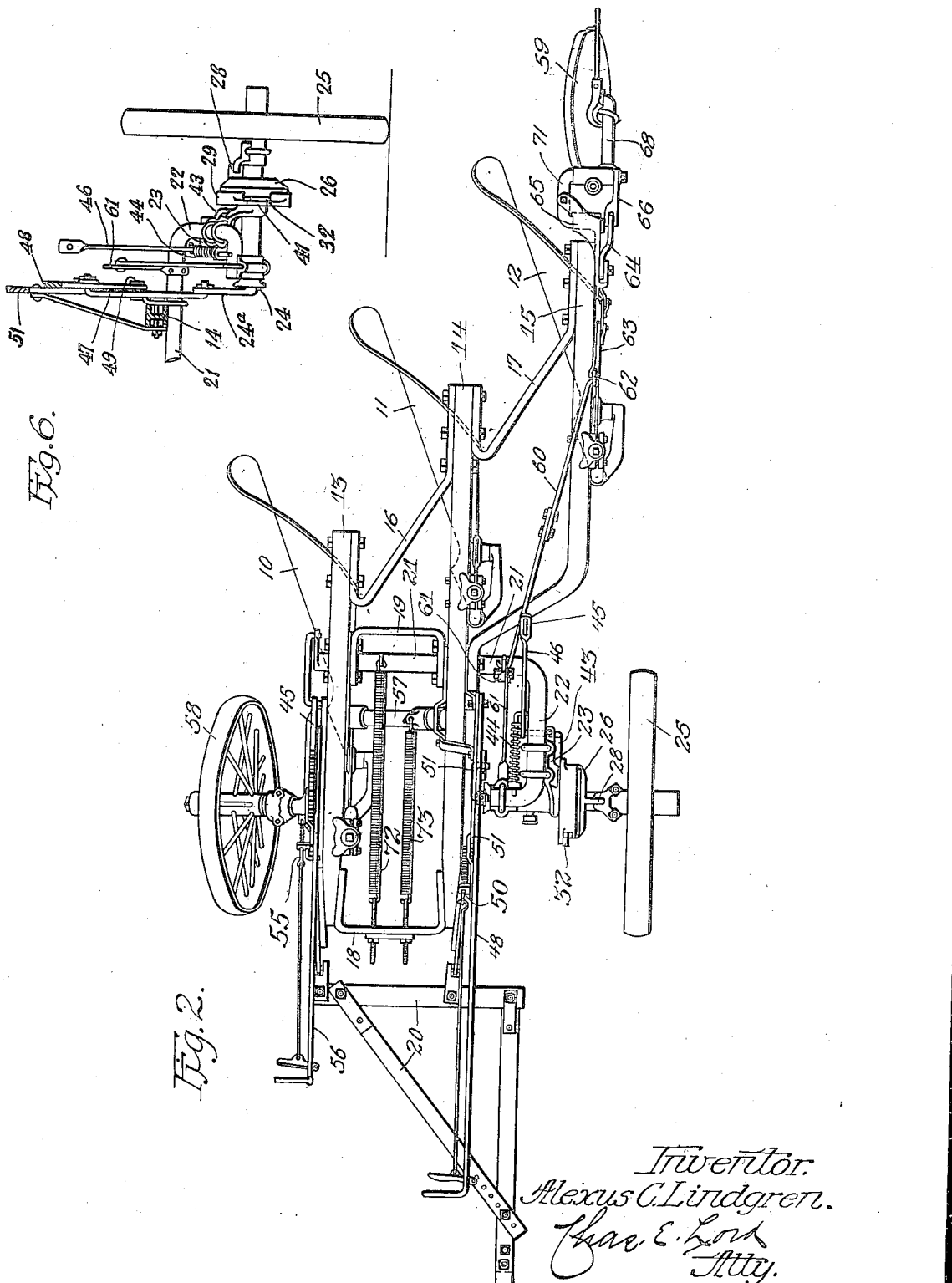

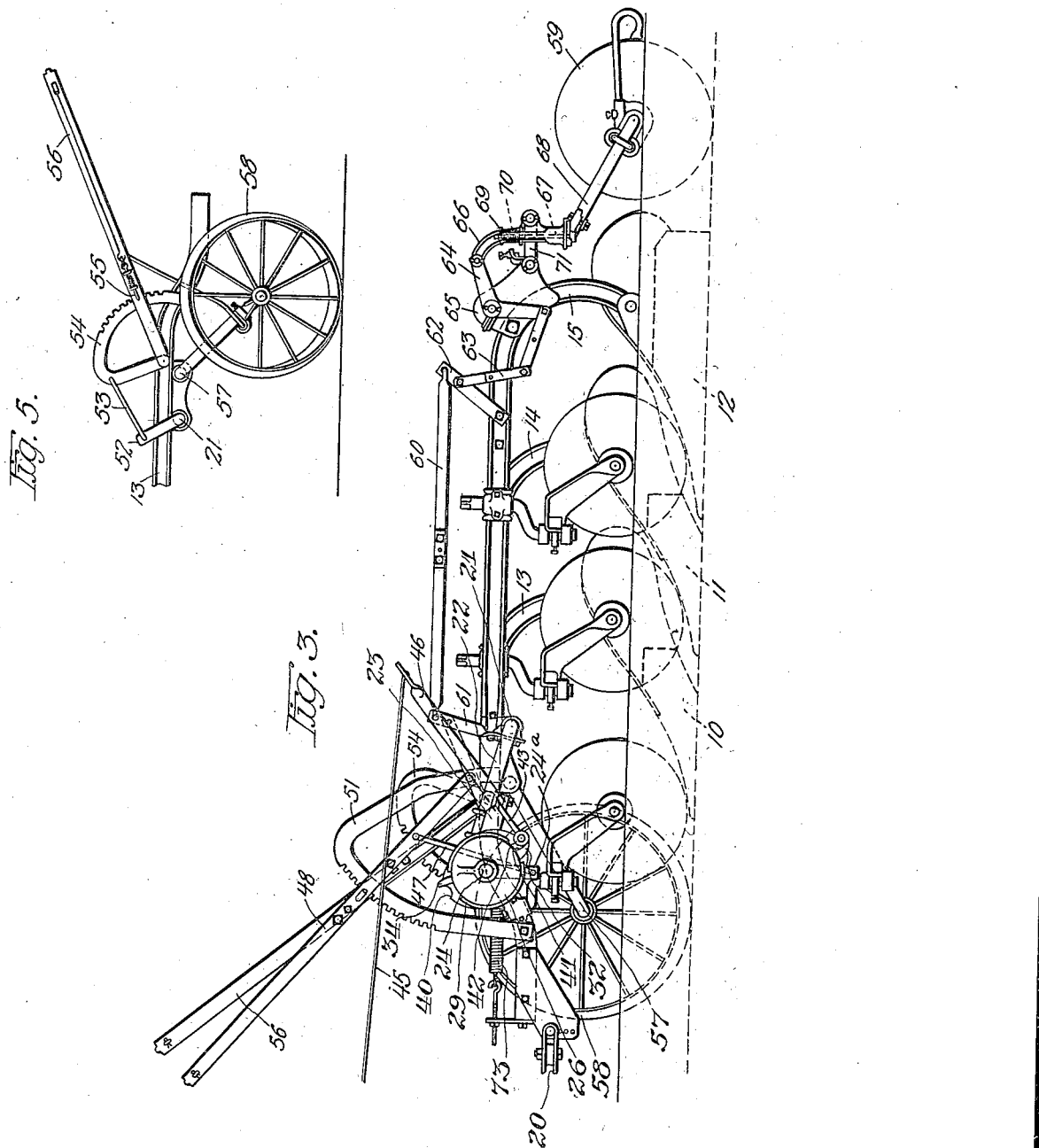

1,440,924

UNITED STATES PATENT OFFICE.

ALEXUS C. LINDGREN, OF HAMILTON, ONTARIO, CANADA, ASSIGNOR, BY MESNE ASSIGNMENTS, TO FRED GERLACH AND ARNOLD B. KELLER, TRUSTEES, BOTH OF CHICAGO, ILLINOIS.

POWER LIFT PLOW.

Application filed April 30, 1919. Serial No. 298,756.

*To all whom it may concern:*

Be it known that I, ALEXUS C. LINDGREN, a citizen of the United States, residing at Hamilton, in the county of Wentworth and Province of Ontario, Dominion of Canada, have invented certain new and useful Improvements in Power Lift Plows, of which the following is a full, clear, and exact specification.

This invention relates to plows and more particularly to power lift plows.

One of the objects of the invention is to facilitate the raising and lowering of the frame and plow shares with respect to the ground.

Another object is to improve the mechanism including the control parts for raising and lowering the frame and plow bases of a power lift plow, and to effect such action by intermittently acting mechanism which will act positively both when raising and when lowering, in contradistinction to previous lift devices where the plows are simply released and dropped when lowering.

Another object is to provide a simple, compact plow adapted to meet all the requirements for successful commercial operation.

Another object is to improve power lift plows by providing the land and furrow wheels with crank axles so positioned that there will be no tendency in the raised position of the plow to cramp these wheels under the plow.

These and other objects are attained by my invention which comprises a power lift plow having a frame, plow bases carried thereby, crank shafts mounted on the frame, means for operatively connecting said crank axles, ground wheels journaled on the crank axles, clutch means connected to one of said wheels for positively raising and lowering the frame by the action of said wheel.

The invention is illustrated on the accompanying sheets of drawings, in which:—

Figure 1 is a side elevation of my improved plow embodying various novel features, the plow shares being in a raised position;

Fig. 2 is a plan view of the same plow;

Fig. 3 is a side elevation of the same plow with the plow shares lowered into the ground;

Figure 4 is a detail view showing the clutch arrangement whereby the positive raising and lowering of the plow is accomplished;

Fig. 5 is a partial side elevation showing the furrow-wheel and lever in detail.

Fig. 6 is a detail front view showing the land wheel axle and lifting connections.

The various novel features of my invention will be apparent from the following description and the drawings, and will be particularly pointed out in the appended claims.

I have chosen to illustrate my invention in connection with a three-bottom plow or a plow having three plow bases 10, 11 and 12, respectively, secured to beams 13, 14 and 15, which are connected at their rear ends by diagonal brace bars 16 and 17. The front ends of beams 13 and 14 are connected by a U-shaped bracket 18, and intermediate portions of the plow beams 13 and 14 are connected by a cross brace 19. The front end of the plow beam 15 is bent laterally and secured to an intermediate portion of the plow beam 14. Pivotally connected to the front end of the plow frame, which includes plow beams 13 and 14, is any suitable draft connection 20. Connected to the plow beams 13 and 14 for a rocking action with respect thereto is a crank shaft 21 having at one end thereof a forwardly and downwardly extending crank arm 22, whose function will be hereinafter explained. To the lower end of the crank arm is secured a bracket 23, journaled in which is a transversely extending power shaft 24, on one end of which is journaled a land side wheel 25. The other end of this shaft carries a crank whose function will hereinafter be explained.

On this shaft is journaled a rotatable clutch element 26 having internal notches 27 as shown in dotted lines in Fig. 4. The clutch element 26 is driven in any suitable manner, such as the lug 28, by the ground wheel 25. Keyed or otherwise secured to the shaft 24 is a normally stationary clutch element 29, having a laterally extending hub 30 and an arm 31 to which is pivotally connected an arm 32 having a roller 33 pivotally mounted thereon which is adapted to engage the notches 27 in the rotatable clutch element 29. The hub 30 also has an arm 31ª to which is hingedly mounted another arm 34 having a pin 35 thereon which engages a slot 36 in the roller arm 37 which is directed oppositely to arm 32 and in turn is hinged at the same point as the arm 32. A roller 33ª similar to the roller 33 is carried by the roller arm 37 and is adapted to engage the internal notches 27 on the opposite side from those engaged by the roller 33 and prevents reverse rotation of clutch element 26. The arm 34 also is connected to the arm 32 by means of a link 38 so that the rollers 33 and 33ª are simultaneously moved into and out of engagement with the internal notches 27. The spring 39 tends to keep the rollers in engagement.

The stationary clutch element 29 has two notches 40 and 41 unequally spaced in its periphery, as explained later, and adapted to be engaged by the roller 42 carried by the crank 43 which is journaled in the bracket 23. A spring 44 tends to keep the roller 42 in engagement. It will be noted that the outer ends of the arms 32 and 34 are held in the retracted position when the roller 42 is seated in the bottom of one of the notches 40 or 41. Thus the element 29 is held stationary and at the same time the clutch is held disengaged. The clutch is tripped by means of the trip rope 45 fastened to the lever 46 mounted on the crank 43.

The crank 24ª on the inner end of the power shaft 24 carries a connecting rod 47, the upper end of which is connected to a depth regulating lever 48 which is pivotally connected to the frame at 49 and has a detent 50 which locks the lever to a sector 51.

The right-hand end of the crank shaft 21 is provided with an upstanding arm 52 which is connected by a link 53 to a segment 54 which is engaged by the detent 55 of a hand-operated lever 56, the latter of which is connected to a crank shaft 57, one end of which is provided with a furrow wheel 58 which normally runs in a furrow. The other end of the crank shaft 57 is parallel to the end carrying the furrow wheel, both being set at an angle to the shaft 21, and this shaft also is connected to the plow beams 13 and 14 for a rocking action with respect thereto.

In Figure 3 of the drawings the plow shares are shown in a plowing position; that is, they are in the ground, and it will be noted that the depth levers are set for maximum depth and that the crank arm 22 of the crank shaft 21 extends almost horizontally forward with the land side wheel 25 in a somewhat elevated position with respect to the frame of the plow and also with respect to the plow bases. It will be seen that this construction permits the crank shafts at the forward end of the plow to be kept at such an angle to the vertical that the crank arms carrying the wheels will not be cramped and forced back under the plow frame. This is particularly true when the frame is raised as shown in Fig. 1. In that type of power lift plow having a crank which is nearly vertical in the raised position of the plow, the tendency to cramp the power wheel under the frame is so great that in many instances the plow will not lower while it is being moved forward even when the power clutch is thrown in. This tendency is increased by soft or rough ground. The furrow wheel 58 and its associated parts are in a corresponding position. However, it will be noted that the furrow wheel 58 operates in the last made furrow of the previous trip.

To raise the plow frame from the position shown in Figure 3 to that of Figure 1, the operator pulls upon the rope or cable 45 and the roller 42 passes out of the notch 40 in which it is engaged and permits the rollers 33 and 33ª to engage any of the notches 27; and the relatively stationary clutch member together with shaft 24 rotates with the wheel 25 until roller 42 enters notch 40. In like manner withdrawing roller 42 from notch 40 sets the clutch in motion to lower the plow frame, but owing to the function of the arm 37 and roller 33ª, reverse movement of the clutch is prevented and positive lowering of the frame by action of the clutch takes place in contradistinction to dropping of the frame by its own weight as in previous constructions of this type.

The notches 40 and 41 on the stationary member 29 are spaced unequally so that they will fall at points located so that the pawl roller 33 will disengage in all positions of the adjusting levers just after the link 47 has passed the dead center of the stationary member 29. This construction is particularly necessary where the fulcrum of the adjusting lever is offset from the crank shafts, as is the case in this plow. As soon as the roller 42 is disengaged, the cable 43 may be released and the roller 42 will ride over the outer periphery of the relatively stationary clutch member and will then pass into engagement with the other notch 40 or 41 to throw the roller 33 out of engagement with the notches 27 so as to prevent further movement of the relatively stationary clutch member; or, in other words, to prevent accidental lowering of the plow bases into the ground.

In order to raise the rear end of the plow frame and plow bases out of the ground, a connection is provided between the crank shaft 21 and the rear carrying wheel 59, which connection includes a link 60, the front end of which is pivotally connected to an arm 61 on the crank shaft 21, the rear portion of the link 60 being operatively connected through other links to the free end of a lever 62, the other end of which is pivotally connected to the plow beam 15.

Pivoted intermediate the ends of the link 62 is a link 63 which is operatively connected through a series of links to one arm of a bell crank lever 64 which is suitably supported in a casting 65 secured to the rear end of the plow beam 15. The other arm of the bell crank lever is pivotally connected to a hollow casting 66 in which is mounted the vertical stem 67 of the support 68 for the wheel 59 which is thereby given a free swinging movement. Surrounding the upper end of the stem and located intermediate the casting 66 and a suitable nut 69 is a tension spring 70 which tends to hold the wheel straight while plowing while allowing it to caster when the plows are raised. Suitably supporting the wheel structure at the rear is a link 71 which pivotally connects the casting 65 with the casting 66.

By means of this arrangement it is seen that when the shaft 21 is rocked for raising the front end of the plow beams and plow bases, a corresponding motion is not only transmitted to the crank shaft 57 for assisting, but the rear end of the frame is raised following the raising movement of the front end of the frame, that is to say owing to the lost motion in straightening links 63, the front end of the plow frame is first raised and then the rear end of the plow frame is raised, or, in other words, the points of the plow bases are first raised or tilted in an upward direction and then the rear ends of the plow bases are raised. The operation of the raising of the front and rear ends of the plow frame and the raising of the front and rear ends of the plow bases may be said to be successive.

The plow frame and bases are lowered mainly by their own weight but under control of the action of the clutch. It will be noted that the depth of the plows may be regulated by movement of the hand control levers 48 and 56 with respect to their segments, but in the automatic movements of raising and lowering, the hand levers are locked to their cooperating segments. Suitable counter-balancing springs 72 and 73 are operatively connected respectively to the crank shafts 57 and 21 and adjustably connected with respect to the bracket 18 for assisting the raising of the plow bases and for preventing their dropping too suddenly, and for taking excessive strain off the land wheel in raising the plow bases.

By means of this arrangement a simple and compact plow is provided which is adapted to meet all the requirements for successful commercial operation.

It is apparent that there may be modifications of the invention, and it is my intention to cover all such modifications which do not involve a departure from the spirit and scope of the invention as set forth in the following claims.

1. In a power lift plow, a frame, plow bases carried thereby, crank axles mounted on the frame with the cranks extending forwardly, means for operatively connecting said crank axles, ground wheels journaled on the crank axles, and a clutch connected to one of said wheels and including means for positively raising and lowering the frame at a constant speed governed by rotation of said wheel.

2. In a power lift plow, a frame, plow bases carried thereby, crank axles mounted on the frame with the cranks extending forwardly, means for operatively connecting said crank axles, ground wheels journaled on the crank axles, and intermittently operable lift mechanism connecting the frame to one of said wheels, including means for oscillating the axles at constant speed governed by rotation of said wheel to raise and lower the frame.

3. In a power lift plow, a frame, plow bases carried thereby, crank axles mounted on the frame with the cranks extending forwardly, means for operatively connecting said axles, ground wheels journaled on the crank axles, and a clutch connected to one of said wheels including an element rotatable jointly with said wheel during successive half revolutions, a link connected to said frame and eccentrically connected to said element and means for locking said element to said wheel to positively shift the axles and effect alternate raising and lowering of the plows.

4. In a power lift plow, a frame, plow bases carried thereby, cranked axles journaled on the frame with the cranks extending forwardly, operating connections between the axles, supporting wheels on the axles, a power shaft journaled on one of the axle cranks and provided with a crank arm on one end, a rigid link connecting said crank arm to the frame, and means for intermittently locking said power shaft to the supporting wheel for a fixed cycle of rotation in unison therewith, thereby alternately raising and lowering the plows at a constant speed.

5. In a power lift plow, a frame, transverse crank shafts mounted on the frame with the cranks extending forwardly, wheels on the cranks thereof, adjusting levers mounted on the frame, at points in advance of the transverse portions of the shafts and provided with links connected to the cranks thereof, a double acting power lift clutch connected to one of the wheels and governing the speed at which the frame is lifted and lowered by the rotation of said wheel, a link connection between the clutch and one of the levers, and a link connecting the crank shafts.

In testimony whereof I affix my signature.

ALEXUS C. LINDGREN.

Witnesses:
 HELEN EDMONSTON,
 ALICE McKENZIE.